3,230,243
HALOBENZYL THIOCARBANILATES
John J. D'Amico, Charleston, W. Va., assignor to Monsanto Company, a corporation of Delaware
No Drawing. Filed May 9, 1961, Ser. No. 108,769
7 Claims. (Cl. 260—455)

This invention relates to methods of controlling undesired vegetation and to herbicidal compositions. More particularly, it relates to methods of controlling undesired vegetation which comprises applying thereto a phytotoxic concentration of a phytotoxic halobenzyl thiocarbanilate.

Aliphatic esters of dialkyl thiocarbamic acids comprise well-known grass specific herbicides. On the other hand, benzyl and halobenzyl esters are toxic to broadleaved plants. It has now been found that toxicity to broadleaved plants is intensified by applying thereto 2,6-halogenated benzyl N-alkyl thiocarbanilates. This is surprising because it had been observed that presence of aryl on nitrogen usually reduced toxicity to susceptible plants. Thiolcarbanilates containing only one sulfur atom are more effective and are preferred. Halobenzyl thionocarbanilates, for example, are effective both pre-emergence and contact whereas dithiocarbanilates are effective in pre-emergence application only. Monothiocarbanilates may be brought into contact with living plants by application to the foliage to destroy undesired vegetation. Tillering and other formative effects result from application of the new toxicants.

The toxicants of this invention may be represented by the formula

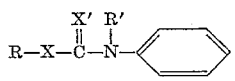

where R is halobenzyl containing at least two but not more than four halogen atoms, two of which are in the 2- and 6-positions, X and X' are oxygen or sulfur but at least one and preferably only one is sulfur and R' is lower alkyl. R' is preferably ethyl but may be another lower alkyl radical, as for example methyl, propyl, isopropyl, butyl, and amyl. The halogen substituents are preferably chlorine but bromine and to a lesser extent fluorine and iodine are also suitable. These appear to be new compounds.

Halobenzyl thionocarbanilates may be prepared by condensing halobenzyl alcohol with a thiocarbamyl halide. Condensing a halobenzyl halide with a salt of a dithio- or thiolcarbanilic acid yields dithio- and thiolcarbanilates respectively. The compounds designated ar,ar,ar-trichlorobenzyl esters were derived from reaction with mixed isomers of chlorobenzyl bromide or a chlorobenzyl alcohol containing an average of three chlorine atoms in the carbocyclic ring. These mixtures, while not pure specific isomers, contain a major proportion of the chlorine in the 2- and 6-positions. They are predominately 2,3,6-isomers. These randomly chlorinated benzyl halides may be prepared as described by Kenneth L. Godfrey in U.S. Patent No. 2,977,210, issued March 28, 1961. The invention will be fully understood and apparent from the detailed examples which follow.

EXAMPLE 1

Into a reactor was charged 30.3 grams (0.25 mole) of N-ethylaniline, 100 ml. of ethyl alcohol and 25 grams of concentrated ammonium hydroxide. To the stirred solution was added in one portion 25 grams (0.33 mole) of carbon bisulfide. The mixture was held at 25-30° C. for one hour and then 68.6 grams (0.25 mole) of α-bromo-ar,ar,ar-trichlorotoluene was added in one portion, causing the temperature to rise from 20 to 46° C. The reaction mixture was stirred at 25-30° C. for 24 hours, then 500 ml. of water added. After stirring for 15 minutes, the reaction mixture was extracted with 300 ml. of ethyl ether. The product was filtered and air dried. After recrystallization from a heptane-chloroform solution the product melted at 181-183° C. There was obtained in 45% yield ar,ar,ar-trichlorobenzyl N-ethyldithiocarbanilate as a cream solid analyzing 3.7% nitrogen and 16.5% sulfur compared to 3.6% nitrogen and 16.4% sulfur calculated for $C_{16}H_{14}Cl_3NS_2$. It was insoluble in water and ether but soluble in acetone, benzene, chloroform, hot heptane and hot ethyl acetate.

EXAMPLE 2

Replacing α-bromo-ar,ar,ar-trichlorotoluene of Example 1 with an equal molecular weight of α-2,3,6-tetrachlorotoluene, the temperature rose from 28 to 40° C. The product was isolated as described and air-dried at 25-30° C. After recrystallization from ethyl acetate the 2,3,6-trichlorobenzyl N-ethyldithiocarbanilate melted at 190-191° C. It was obtained in 36.8% yield as a tan solid analyzing 3.9% nitrogen, 16.2% sulfur and 27.1% chlorine compared to 3.6% nitrogen, 16.4% sulfur and 27.2% chlorine calculated for $C_{16}H_{14}Cl_3NS_2$. It was insoluble in water, ether, acetone, heptane and ethanol but soluble in benzene, chloroform and hot ethyl acetate.

EXAMPLE 3

To a solution of 17.7 grams (0.1 mole) of 2,6-dichlorobenzyl alcohol in 300 ml. of benzene there was added in one portion 20 grams (0.1 mole) of N-ethylphenylthiocarbamyl chloride. The mixture was then heated at refluxing temperature for 18 hours. The product was cooled to 25° C. and 200 ml. of water added. After stirring for 15 minutes layers separated and the top benzene layer was washed with water until neutral to litmus and dried over sodium sulfate. Benzene was removed in vacuo at a maximum temperature of 80-90° C./1-2 mm. 2,6-dichlorobenzyl N-ethylthionocarbanilate was obtained in 85% yield as an amber oil which became a semi-solid on standing. Analysis gave 4.1% nitrogen compared to 4.2% calculated for $C_{16}H_{15}Cl_2NOS$. It was insoluble in water, slightly soluble in ether, acetone and heptane but soluble in hot benzene and hot ethanol.

EXAMPLE 4

Substituting 21.1 grams (0.1 mole) of 2,3,6-trichlorobenzyl alcohol for the 2,6-dichlorobenzyl alcohol in Example 3, 2,3,6-trichlorobenzyl N-ethylthionocarbanilate was obtained in 58.5% yield as an amber oil which became semi-solid on standing. It was insoluble in water and heptane but soluble in ether, acetone, benzene and ethanol.

EXAMPLE 5

In the procedure of Example 3, ar,ar,ar-trichlorobenzyl alcohol was used. ar,ar,ar-Trichlorobenzyl N-ethylthionocarbanilate was obtained in 74.5% yield as an amber oil. It was insoluble in water but soluble in ether, acetone, benzene, heptane and ethanol.

EXAMPLE 6

Into a reactor was charged 36.4 grams (0.3 mole) of N-ethylaniline, 200 ml. of ethyl alcohol and 30.4 grams (0.3 mole) of triethylamine. To the stirred solution at 5–10° C. was bubbled in 19.5 grams (0.28 mole) of 85% COS over a period of 30 minutes. There was then added 46 grams (0.2 mole) of 2,3,6-trichlorobenzyl chloride in one portion, the reaction mixture stirred at 0–10° C. for 5 hours and then at 25–30° C. for 24 hours. To the stirred reaction mixture was added 200 ml. of water and 30 grams of concentrated hydrochloric acid and stirring continued for 5 minutes. The product was extracted with 400 ml. of ethyl ether, the ether solution washed with water until neutral to litmus and dried over sodium sulfate. Ether was removed in vacuo at a maximum temperature of 200° C./3–4 mm. 2,3,6-trichlorobenzyl N-ethylthiolcarbanilate was obtained in 78.9% yield as an amber oil analyzing 3.6% nitrogen compared to 3.7% calculated for $C_{16}H_{14}Cl_3NOS$. It was insoluble in water but soluble in common organic solvents.

Herbicidal compositions may be prepared by admixing the ester with a carrier material in order to provide formulations adapted for ready and efficient application in liquid or solid form. Although the esters of this invention are insoluble in water, they are soluble in some organic solvents. Emulsions or suspensions may be prepared by dispersing the esters either per se or in the form of an organic solution thereof in water with the aid of a water-soluble surfactant. The term "surfactant" as employed here and in the appended claim is used as in Volume II of Schwartz, Perry and Berch's "Surface Active Agents and Detergents" (1958, Interscience Publishers, Inc., New York) in place of the expression "emulsifying agent," "dispersing agent," "wetting agent" and "spreading agent" that are adapted to be admixed with the active compound of this invention in order to secure better wetting and spreading of the compound in water vehicle or carrier in which it is insoluble through lowering the surface tension of the water (see also Frear "Chemistry of Insecticides, Fungicides and Herbicides," second edition page 280). These surfactants include the well-known capillary-active substances which may be anion-active (or anionic), cation-active (or cationic), or non-ionizing (or non-ionic) which are described in detail in Volumes I and II of Schwartz, Perry and Berch's "Surface Active Agents and Detergents" (1958 Interscience Publishers, Inc, New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosure of these articles with respect to surfactants, i.e. the anion-active, cation-active and non-ionizing capillary active substances, are incorporated in this specification by reference in order to avoid unnecessary enlargement of this specification. The preferred surfactants are the water-soluble anionic surface-active agents and the water-soluble non-ionic surface-active agents set forth in U.S. Patent 2,846,398, granted August 5, 1958. In general it is preferred that a mixture of water-soluble anionic and water-soluble non-ionic surfactants be employed.

The esters can be dispersed by suitable methods (e.g. tumbling or grinding) in solid extending agents either organic or inorganic nature and applied to the plant in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g., bentonite. These mixtures can be used for herbicidal purposes in the dry form, or, by addition of water-soluble surfactants or wetting agents the dry particular solids can be rendered wettable by water so as to obtain stable aqueous dispersions or suspensions suitable for use as sprays.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole of sorbitan monoester or alkylphenol.

For pre-emergence control of plants amounts within the range of ⅛ pound to 100 pounds per acre comprise a range useful for most purposes. Useful properties are illustrated by applying the ester as an aqueous spray to germinating seedlings. The active ingredient was emulsified in water and applied to seeded soil at the rates shown. About fourteen days after application of the toxicant results were observed and recorded. The number of seeds emerging was converted to weighted herbicidal ratings based on average percent germination of any particular seed lot times an injury factor. This evened irregularities of herbicide rating of seeds which varies in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale:

| Percent emergence: | Phytotoxicity rating |
|---|---|
| 0–25% | 3 or severe. |
| 26–50% | 2 or moderate. |
| 51–75% | 1 or slight. |
| 76–100% | 0 or none. |

The phytotoxicities are recorded below:

*Table I*

| Active Ingredient | Lbs./Acre | Results Observed |
|---|---|---|
| 2,3,6-trichlorobenzyl N-ethyldithiocarbanilate. | 25 | Severe phytotoxicity to morning glory, foxtail, barnyard grass and pigweed; moderate phytotoxicity to beet. |
| ar,ar-Trichlorobenzyl N-ethyldithiocarbanilate. | 25 | Severe phytotoxicity to barnyard grass and tomato; moderate phytotoxicity to morning glory, crab grass and sorghum. |
| 2,6-dichlorobenzyl N-ethylthionocarbanilate. | 5 | Severe phytotoxicity to morning glory, beet, crab grass, pigweed and soybean; moderate phytotoxicity to barnyard grass, wild buckwheat and tomato. |
| 2,3,6-trichlorobenzyl N-ethylthionocarbanilate. | 25 | Severe phytotoxicity to morning glory, mustard, beet, barnyard grass, crab grass, pigweed, soybean, wild buckwheat, tomato and sorghum. At rates as low as ¼ lb. per acre morning glory, beet, pigweed, soybean, wild buckwheat and tomato were severely injured. |
| ar,ar,ar-Trichlorobenzyl N-ethylthionocarbanilate. | 5 | Severe phytotoxicity to morning glory, beet, barnyard grass, crab grass, pigweed, soybean and sorghum; moderate phytotoxicity to wild oats, cheat grass, rye grass, mustard, wild buckwheat and tomato. |

Greater efficiency than from surface application results from incorporating the toxicants into the top layer of soil. The relative herbicidal efficiency of the compounds of this invention after incorporation into the surface soil was determined on typical broadleaf plants. Phytotoxicity ratings observed at a dosage of one pound per acre are recorded in Table II.

Table II

| Active Ingredient | Morning Glory | Sugar beet | Pigweed | Soybean | Tomato |
|---|---|---|---|---|---|
| 2,3,6-trichlorobenzyl N-ethyldithiocarbanilate. | 1 | 2 | 3 | 3 | 2 |
| ar,ar,ar-trichlorobenzyl N-ethyldithiocarbanilate. | 1 | 2 | 3 | 3 | 1 |
| 2,3,6-trichlorobenzyl N-ethylthionocarbanilate. | 3 | 3 | 3 | 3 | 3 |
| 2,6-dichlorobenzyl N-ethylthionocarbanilate. | 2 | 2 | 2 | 2 | 1 |
| ar,ar,ar-trichlorobenzyl N-ethylthionocarbanilate. | 2 | 2 | 2 | 3 | 1 |

In foliage tests a spray containing 0.05% of the esters, water and surfactant was applied to the foliage of grass and bean plants and finally to the foliage of a mixture of broadleaved plants and the effect recorded. The same rating key for phytotoxicity was used as above. Following are the results:

Table III

| Active Ingredient | Phytotoxicity Rating | | |
|---|---|---|---|
| | Grass | Bean | Broadleaf |
| 2,6-dichlorobenzyl N-ethylthionocarbanilate. | 2 | 2 | 2 |
| 2,3,6-trichlorobenzyl N-ethylthionocarbanilate. | 0 | 2 | 2 |
| ar,ar,ar-trichlorobenzyl N-ethylthionocarbanilate. | 0 | 2 | 2 |

It is intended to cover all changes and modifications of the examples of the invention herein chosen for purposes of disclosure which do not constitute departures from the spirit and scope of the invention.

What is claimed is:
1. A compound of the formula

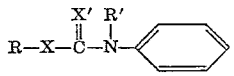

where R is halobenzyl containing at least two but not more than four halogen atoms two of which are in the 2- and 6-positions, X and X' are selected from a group consisting of oxygen and sulfur, at least one of which is sulfur and R' is lower alkyl.

2. A compound of the formula

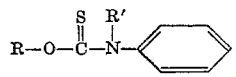

where R is chlorobenzyl containing at least two but not more than four chlorine atoms two of which are in the 2- and 6-positions and R' is lower alkyl.

3. A compound of the formula

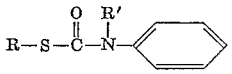

where R is chlorobenzyl containing at least two but not more than four chlorine atoms two of which are in the 2- and 6-positions and R' is lower alkyl.

4. 2,3,6-trichlorobenzyl N-ethylthionocarbanilate.
5. 2,3,6-trichlorobenzyl N-ethylthiolcarbanilate.
6. 2,3,6-trichlorobenzyl N-ethyldithiocarbanilate.
7. 2,6-dichlorobenzyl N-ethylthionocarbanilate.

References Cited by the Examiner
UNITED STATES PATENTS

| | | |
|---|---|---|
| 2,225,124 | 12/1940 | Martin et al. _____ 260—455 X |
| 2,863,899 | 12/1958 | Harris _____ 260—455 |
| 2,941,879 | 6/1960 | Goodhue. |
| 2,943,972 | 7/1960 | Van der Kerk _____ 260—455 X |
| 2,972,627 | 2/1961 | Garmaise _____ 260—455 |
| 2,983,747 | 5/1961 | Campbell et al. _____ 260—455 |
| 2,992,091 | 7/1961 | Harman et al. _____ 71—2.6 |
| 2,997,382 | 8/1961 | Harman et al. _____ 71—2.6 |

FOREIGN PATENTS 858,352   12/1952   Germany.

CHARLES B. PARKER, *Primary Examiner.*

MAURICE A. BRINDISI, JULIAN S. LEVITT,
*Examiners.*

E. J. MEROS, JAMES O. THOMAS, DALE R. MAHANAND, *Assistant Examiners.*